United States Patent

Harvey

(10) Patent No.: US 10,969,133 B2
(45) Date of Patent: Apr. 6, 2021

(54) METHODOLOGY OF OCCUPANT COMFORT MANAGEMENT IN BUILDINGS USING OCCUPANT COMFORT MODELS AND USER INTERFACES THEREOF

(71) Applicant: Troy Aaron Harvey, Brighton, UT (US)

(72) Inventor: Troy Aaron Harvey, Brighton, UT (US)

(73) Assignee: PASSIVELOGIC, INC., Holladay, UT (US)

( * ) Notice: Subject to any disclaimer, the term of this patent is extended or adjusted under 35 U.S.C. 154(b) by 0 days.

(21) Appl. No.: 15/995,019

(22) Filed: May 31, 2018

(65) Prior Publication Data

US 2018/0347845 A1  Dec. 6, 2018

Related U.S. Application Data

(60) Provisional application No. 62/513,036, filed on May 31, 2017.

(51) Int. Cl.

| | | |
|---|---|---|
| *F24F 11/63* | (2018.01) | |
| *G05B 13/02* | (2006.01) | |
| *G05B 13/04* | (2006.01) | |
| *G05B 15/02* | (2006.01) | |
| *F24F 120/14* | (2018.01) | |

(52) U.S. Cl.
CPC .......... *F24F 11/63* (2018.01); *G05B 13/0265* (2013.01); *G05B 13/041* (2013.01); *G05B 15/02* (2013.01); *F24F 2120/14* (2018.01); *G05B 2219/2642* (2013.01)

(58) Field of Classification Search
CPC ........ G05B 13/0265; G05B 2219/2642; G05B 13/041; G05B 15/02; F24F 11/63; F24F 2120/14
USPC ........................................................ 700/276
See application file for complete search history.

(56) References Cited

U.S. PATENT DOCUMENTS

| | | | |
|---|---|---|---|
| 5,224,648 | A | 7/1993 | Simon et al. |
| 6,119,125 | A | 9/2000 | Gloudeman et al. |
| 6,645,066 | B2 * | 11/2003 | Gutta .................. F24F 11/0034 454/229 |
| 6,967,565 | B2 | 11/2005 | Lingemann |
| 7,010,789 | B1 | 3/2006 | Kimelman et al. |
| 9,020,647 | B2 | 4/2015 | Johnson et al. |

(Continued)

OTHER PUBLICATIONS

Carl-Eric Hagentoft, Assessment Method of Numerical Prediction Models for Combined Heat, Air and Moisture Transfer in Building Components: Benchmarks for One-dimensional Cases, Apr. 2004, Journal of Thermal Env. & Bldg. Sci., vol. 27, No. 4 (Year: 2004).*

(Continued)

*Primary Examiner* — Darrin D Dunn
*Assistant Examiner* — Christopher W Carter
(74) *Attorney, Agent, or Firm* — Kunzler Bean & Adamson, PC

(57) ABSTRACT

Disclosed is a system and method for managing the comfort of building occupants. The system utilizes a model-based approach for targeting occupant comfort levels. The system allows for voting input from building occupants regarding their respective comfort. Additionally, the system provides a user interface to gather occupant input and use said input as a parameter in a comfort model.

19 Claims, 2 Drawing Sheets

(56) References Cited

U.S. PATENT DOCUMENTS

| | | | |
|---|---|---|---|
| 9,035,479 | B1 | 5/2015 | Gates |
| 9,258,201 | B2 | 2/2016 | McCoy et al. |
| 9,298,197 | B2 | 3/2016 | Matsuoka et al. |
| 9,557,750 | B2 | 1/2017 | Gust et al. |
| 9,664,400 | B2 | 5/2017 | Wroblewski et al. |
| 10,705,492 | B2 | 7/2020 | Harvey et al. |
| 10,708,078 | B2 | 7/2020 | Harvey et al. |
| 2002/0152298 | A1 | 10/2002 | Kikta et al. |
| 2006/0106530 | A1 | 5/2006 | Horvitz et al. |
| 2008/0082183 | A1 | 4/2008 | Judge |
| 2014/0016572 | A1 | 1/2014 | Porat et al. |
| 2014/0277765 | A1* | 9/2014 | Karimi .................. G05B 15/02 700/276 |
| 2014/0358291 | A1* | 12/2014 | Wells ................. G05D 23/1902 700/276 |
| 2015/0066229 | A1 | 3/2015 | Lacroix et al. |
| 2015/0112497 | A1 | 4/2015 | Steven et al. |
| 2016/0016454 | A1* | 1/2016 | Yang .................. B60H 1/00742 701/36 |
| 2016/0179075 | A1* | 6/2016 | Shin ........................ H04W 4/70 700/275 |
| 2016/0201934 | A1 | 7/2016 | Hester et al. |
| 2017/0076206 | A1 | 3/2017 | Lastras-Montano et al. |
| 2017/0103483 | A1 | 4/2017 | Drees et al. |

OTHER PUBLICATIONS

BigLadder Software, Occupant Thermal Comfort: Engineering Reference, 2014, The Board of Trustees of the University of Ilinois and the Regents of the University of California through the Ernest Orlando Lawrence Berkeley National Laboratory (Year: 2014).*
ANSI/ASHRAE Standard 55-2013: Thermal Environmental Conditions for Human Occupancy, ASHRAE, 2013.
De Dear, et at., "Developing an Adaptive Model of Thermal Comfort and Preference," ASHRAE Transactions 1998, vol. 104, Part 1.
Gagge et al., "An Effective Temperature Scale Based on a Simple Model of Human Physiological Regulatory Response," ASIYRAE Semiannnual Meeting in Philadelphia, Pennsylyania, Jan. 24-28, 1971.
Gagge, et. al., A Standard Predictive index of Human Response to the Thermal Environment, ASHRAE Transactions 1986, Part 2B.
Medhi, et al., Jan. 2011, "Model-Based Hierarchical Optimal Control Design for HVAC Systems," ASME 2011 Dynamic Systems and Control Conference and Bath/ASME Symposium on Fluid Power and Motion Control.
Nakahara, "Study and Practice on HVAC System Commissioning," The 4th international Symposium on HVAC, Beijing, China, Oct. 9-11, 2003.
Nassif, et al., "Self-tuning dynamic models of HVAC system components", Energy and Buildings 40 (2008) 1709-1720.
Nassif, Nabil, (2005), Optimization of HVAC control system strategy using two-objective genetic algorithm [microform].
Qin et al., "Commissioning and Diagnosis of VAV Air-Conditioning Systems," Proceedings of the Sixth International conference for Enhanced Building Operations, Shenzhen, China, Nov. 6-9, 2006.
Salsbury et al., "Automated Testing of HVAC Systems for Commissioning," Laurence Livermore National Laboratory, 1999, LBNL-43639.
Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.
Welsh, "Ongoing Commissioning (OCx) with BAS and Data Loggers," National Conference on Building Commissioning: Jun. 3-5, 2009.
Xiao et al., "Automatic Continuous Commissioning of Measurement Instruments in Air Handling Units," Building Commissioning for Energy Efficiency and Comfort, 2006, vol. VI-1-3, Shenzhen, China.
Nassif, N., Kajl, S., & Sabrouin, R. (Jul. 2005). Optimization of HVAC control system strategy using two-objective genetic algorithm, Journal of HVAC&R Research, 11(3), 459-486. (Year: 2005).
Sushanek, F., Kasneci, G., & Weikum, G. (May 2007). YAGO: A core of semantic knowledge unifying WordNet and Wikipedia, WWW 2007, 1-10. (Year: 2007).
Maasoumy, M., Pinto, A., & Sangiovanni-Vincentelli, A, (2001). Model-based hierarchical optimal control design for HVAC systems, Proceedings of the ASME 2011 Dynamic Systems and Control Conference, 1-8. (Year: 2011).
Bordes, A., Weston, J., Collobert, R., & Bengio, Y. (Aug. 2011). Learning structured embeddings of knowledge bases, Proceedings of the Twenty-Fifth AAAI Conference on Artificial Intelligence, 1-6. (Year: 2011).
Nickel, M., Tresp, V., & Kriegel, H. (2011). A three-way model for collective learning on multi-relational data, Proceedings of the 28th International Conference on Machine Learning, 1-8. (Year: 2011).
Socer, R., Chen, D., Manning, C., & Ng, A. (Jan. 2013). Reasoning with neural tensor networks for knowledge base completion, 1-10. (Year: 2013).
Berant, L., Chou, A., Frostig, R., & Ling, P. (Oct. 2013). Semantic parsing on Freebase from question-answer pairs, Proceedings of the 2013 Conference on Empirical Methods in Natural Language Processing, 1533-1544. (Year: 2013).
Bordes, A., Usunier, N., Garcia-Duran, A., Weston, J., & Yakhenko, O. (Apr. 2013). Irreflexive and hierarchical relations as translations, 1-5. (Year: 2013).
Bordes, A., Usunier, N., Garcia-Duran, A., Weston, J., & Yakhenko, O. (Dec. 2013). Translating embeddings for modeling multi-relational data, Neural Information Processing Systems (NIPS), 1-9. (Year: 2013).
Chang, K., Yih, W., & Meek, C. (Oct. 2013). Multi-relational latent semantic analysis, Proceedings of the Conference on Empirical Methods in Natural Language Processing (EMNLP), 1-11. (Year: 2013).
Weston, J., Bords, A., Yakhnenko, O, & Usunier, N. (Jul. 2013). Connecting language and knowledge bases with embedding models for relation extraction, 1-6 (Year: 2013).
Min, B., Grisham, R., Wan, L., Wang, C., & Gondex, D. (Jun. 2013). Distant supervision for relation extraction with an incomplete knowledge base, Proceedings of NAACL-HLT 2013, 777-782. (Year: 2013).
Wang, Z., Zhang, J., Feng, J., & Chen, Z. (2014). Knowledge graph embedding by translating on hyperplanes, Proceedings of the Twenty-Eighth AAAI Conference on Artificial Intelligence, 1112-1119. (Year: 2014).
Yang, B., Yih, W., He, X., Gao, J., & Deng, L. (Dec. 2014). Embedding entities and relations for learning and inference in knowledge bases, 1-12. (Year: 2014).
Bordes, A., Glorot, X., Weston, J., & Bengio, Y. (2014). A semantic matching energy function for learning with multi-relational data, Machine Learning, 94(2), 233-259. (Year: 2014).
Lin Y, Liu, Z., Sun, M., Liue, Y., & Zhu, X. (2015). Learning entity and relation embeddings for knowledge graph completion, in Proceedings of AAAI'15, 1-7. (Year: 2015).
He, H., Balakrishnan, A., Eric, M., & Liang, P. (Apr. 2017). Learning symmetric collaborative dialogue agents with dynamic knowledge graph embeddings, 1-11. (Year: 2017).
Carl-Eric Hagentoft, Assessment Method of Numerical Prediction Models for Combined Heat, Air and Moisture Transfer in Building Components: Benchmarks for One-dimensional Cases, Apr. 2004, Journal of Thermal Env. & Bldg. Sci., VI. 27, No. 4 (Year: 2004).
BigLadder Software, Occupant Thermal Comfort: Engineering Reference, 2014, The Board of Trustees of the University of Illinois and the Regents of the University of California through the Ernest Orlando Lawrence Berkeley National Labaratory (Year: 2014).
U.S. Appl. No. 15/986,746 Office Action dated Mar. 25, 2020.
U.S. Appl. No. 15/986,746 Office Action dated Aug. 7, 2019.
U.S. Appl. No. 16/008,713 Final Office Action dated Jun. 18, 2020.
U.S. Appl. No. 16/008,713 Office Action dated Nov. 1, 2019.

* cited by examiner

METHODOLOGY OF OCCUPANT COMFORT MANAGEMENT IN BUILDINGS USING OCCUPANT COMFORT MODELS AND USER INTERFACES THEREOF

FIELD

The present disclosure relates to methods and systems that enable optimal control of buildings using comfort based control using proxies of the building occupants. More specifically, the present disclosure relates to a methodology of group estimation of individual occupant comfort, and devices and user interfaces to gather the comfort parameters to be used as inputs in a comfort model.

BACKGROUND

Buildings comprise a varied and complex set of systems for managing and maintaining the building environment. Building automation systems, comprising centralized control of separate systems such as for heating, cooling, ventilation, lighting, climate, security, entertainment, etc., can be used to perform the complex operations required by the building and its occupants and equipment and to optimize those operations for efficiency, cost, energy, priority, and so on.

In some automation systems, one or more control systems apply to the Heating, Ventilating, and Air-Conditioning (HVAC) systems in a building.

HVAC control systems typically comprise four basic elements: at least one sensor, at least one controller, at least one controlled device, and at least one source of energy. 1) A sensor measures the value of at least one variable such as temperature, humidity, and/or flow and provides its value or values to at least one controller. 2) A controller may receive input from at least one sensor, processes the input, and produces an output signal for at least one controlled device. 3) A controlled device acts to modify at least one variable as directed by a controller. 4) A source of energy provides power to the control system.

An HVAC control system typically comprises one or more sensors that measure the building climate state (e.g., temperature). The measured building climate state is compared with some defined target state (e.g., the desired temperature). The compared difference between the measured state and the target state is used by the controller to determine what actions are to be taken to bring the measured state value closer to the target state value (e.g., start a fan).

Advanced controllers today are programmable, allowing one or more users to configure parameters such as set-points, timers, alarms, and/or control logic. These HVAC controllers can allow control of a wide range of environmental conditions beyond temperature, humidity, and air flow, taking into account, for example, changes in occupancy.

Fundamentally, building automation systems and HVAC control systems have a purpose of improving the comfort of building occupants. Building occupants are individuals or groups of individuals, living or non-living, present in, near, and/or around the building for any period of time.

Efforts to improve building automation systems and HVAC control systems have focused on improving areas such as ease and flexibility of installation, efficient resource consumption, and increased connectivity (Brought forth via U.S. patent Ser. Nos. 10/608,828, 12/710,845, 13/866,578, 14/353,953, 07/858,480, 13/828,133).

To date, all research targeted at building automation systems to improve comfort showed that the target state of an HVAC control system is determined by occupant input through a simple, though often inconvenient to use, interface device, such as by a thermostat.

The thermostat may include HVAC control circuitry capable of actuating one or more elements of the HVAC system, and one or more sensors for measuring characteristics of the smart home environment. The thermostat may also include a processor coupled to the HVAC control circuitry and the one or more sensors, which may be operable to cause the thermostat to perform a variety of operations, such as sensing a Demand Response (DR) event that defines a DR event period, and determining a control path of the HVAC control system.

A dependency on an a priori or arbitrary input element such as the thermostat has the undesirable effect of skewed comfort preferences of a typical occupant vis-à-vis other occupants who had last control over the input. This dependency leads to a sub-optimal building environment due to continual adjustments by one or more occupants struggling to ensure their respective comfort.

Typically, HVAC control systems are managed by centralized control of temperature set-points, whereby thermostats are accessible to a restricted set of occupants, or in some cases exclusively to facilities management personnel who may or may not be building occupants. In cases where occupants do not have access to set-points, HVAC control systems may involve standardized settings based on building type and use and/or assumptions about the occupants' comfort. These HVAC control systems have limited ability to respond to occupants' preferences, thus providing inadequate level of comfort. Thus, a basic purpose of a HVAC control system, that of providing comfort for building occupants, remains unaddressed.

In all cases previously discussed, HVAC control systems are model-free relating to building occupant comfort. Model-free control systems comprise no physical model for describing, assessing, and/or controlling the comfort of building occupants. Model-free control systems have been typically used because of the simplicity of implementation. However, when the systems and variables being controlled are knowable and/or measurable, a model-free control system is not as accurate and/or useful as a model-based control system. Additionally, model-free control systems may require a lot of feedback before accuracy or usefulness are achieved, which may take a long time to accumulate. In the context of HVAC control systems, a model-free control system means that building occupant comfort is in a sub-optimal state most of the time. And secondary learning systems applied on top of model free controls either do not have enough insight to adequately perform the task, or require very long learning periods to stabilize.

SUMMARY

The present disclosure provides a solution to the problem of building occupant comfort based control for building automation systems, estimating individual occupant comfort based on physics principles, managing comfort for a group of occupants for the best group satisfaction, and making path based control strategies based on time series comfort-based control. Furthermore, the present disclosure relates to electronic devices that measure human comfort for the purpose of comfort based control, and interfaces that abstract the parameters of those comfort models as to simplify user interaction.

In some embodiments, there is a system and method for managing the comfort of building occupants comprising a model representing one or more building occupants, called an occupant proxy in the present disclosure. The occupant proxy models the comfort of the building occupant being represented.

In some embodiments, a meta-proxy representing all occupant proxies is modeled based on a method such as a voting system of the building occupants. The meta-proxy represents the comfort of all building occupants.

In some embodiments, a meta-proxy comprises a mean function of occupant proxy votes and an output function whereby the meta-proxy provides one or more target variables for the building control system.

In some embodiments, the occupant proxy model may comprise a human comfort model represented by a mathematical equation based on environmental variables, occupant characteristics, and/or occupant preferences.

In some embodiments, a user interface for each building occupant provides occupant comfort input to the control system that may be used to compare the occupant proxy comfort to the building occupant comfort. This compared difference between occupant state and occupant proxy state may be used to make control decisions to improve building occupant comfort and/or other variables.

In some embodiments, a user interface may be a passive device comprising one or more sensors for the purpose of measuring variables affecting occupant comfort, for example occupant activity.

In some embodiments, inputs from passive and/or active user interfaces may be stored in a profile of a building occupant proxy.

There has thus been outlined, rather broadly, certain non-limiting features of the disclosure in order that the detailed description thereof that follows may be better understood and in order that the present contribution to the art may be better appreciated.

Numerous objects, features, and advantages of the present disclosure will be readily apparent to those of ordinary skill in the art upon a reading of the following detailed description of presently preferred, but nonetheless illustrative, embodiments of the present disclosure when taken in conjunction with the accompanying drawings. The disclosure is capable of other embodiments and of being practiced and carried out in various ways. Also, it is to be understood that the phraseology and terminology employed herein are for the purpose of descriptions and should not be regarded as limiting.

BRIEF DESCRIPTION OF DRAWINGS

This disclosure presents embodiments in detail with reference to the following figures wherein.

REFERENCE NUMERALS

Figure 1:
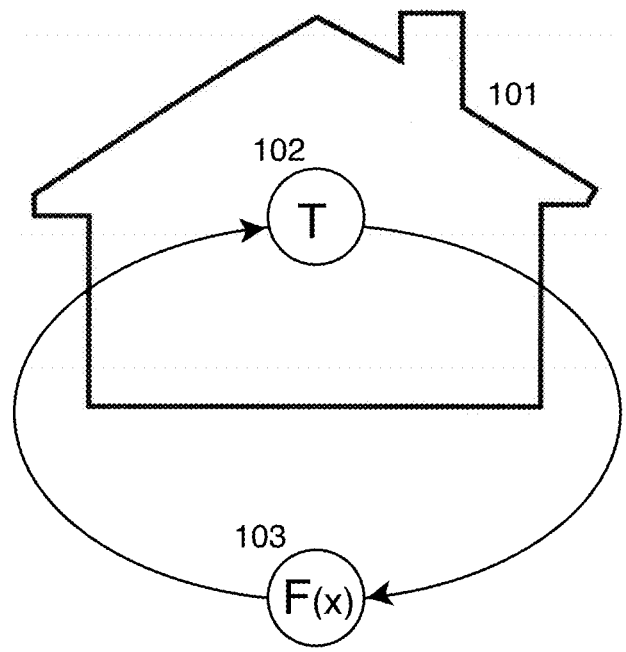
FIG. 1 illustrates a building control loop.

The following conventions are used for reference numerals: the first digit indicates the figure in which the numbered part first appears (the first two digits are used for the figure number when required). The remaining digits are used to identify the part in the drawing.

| 101 | base of closure | 102 | traditional set-point control device |
| 103 | traditional output function | 201 | meta-proxy |
| 202 | meta-proxy output function | 301 | occupant |
| 302 | occupant profile | 303 | occupant state |
| 304 | occupant proxy | 401 | environmental variables |
| 402 | human comfort model | 403 | occupant comfort mean function |

DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the disclosure and together with the description, serve to explain the principles of the disclosure. To the accomplishment of the foregoing and related ends, certain illustrative aspects of the disclosure are described herein in connection with the following description and the annexed drawings. These aspects are indicative, however of, but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

From the description above, a number of advantages of specific embodiments of the disclosure are apparent.

An object of the present disclosure is to achieve a more occupant-centric and/or accurate estimation of occupant comfort. In some embodiments, this more accurate occupant comfort model is used to control the building systems.

Another object of the present disclosure is to provide a model-based occupant proxy for each building occupant such that the proxy reflects the comfort experienced by the occupant using the comfort model applied. This model may comprise a representation of occupants and occupant preferences through encoded knowledge and information of the physical and psychological components of comfort.

Another object of the present invention is to include a meta-proxy for building occupants that represents the group comfort vote of one or more building occupant's comfort. In some embodiments, a building control system can be controlled by one or more meta-comfort measures.

Another object of the present disclosure is to base the occupant model on the voting pattern of one or more building occupants. In some embodiments, this voting pattern may provide input to a building control system.

In some embodiments, another object of the present disclosure is to include a meta-proxy for the building occupants that allows for gathering implied feedback as to occupant comfort. This meta-proxy may be used by the building control systems in addition to explicit user feedback in order to provide more optimal management of the environmental system control for anonymous occupant system control.

In some embodiments another object of the present invention is to include a proxy for the non-human assets that allows for comfort models of equipment, building envelope components, animals, plants, collections, systems, and/or other items in, near, and/or around the building and/or building perimeter to provide more optimal management of the quality, durability, comfort, value, and/or longevity of these assets.

Another object of the present disclosure is to provide a user interface to acquire comfort data received actively or passively via sensors or other means. In some embodiments, this comfort data may be stored by any method to compose a building occupant's historic preferences. In some embodiments, these historic preferences may be used by the building control systems to optimize control paths.

Another object of the present invention is to minimize the learning time for stabilization of building occupant comfort.

Explanation will be made below with reference to the above figures for illustrative embodiments concerning the predictive building control loop according to the current disclosure.

There are several advantages that, in certain embodiments, can be gained from applying comfort model-based control to building automation systems and building control systems.

In some embodiments, the present system provides improved environmental control with a particular focus on achieving occupant comfort. Such a system will maintain a more comfortable environment for building occupants while solving the problems previously noted with traditional HVAC control systems and with model-free control. The remainder of this section describes one such possible embodiment, referring to drawings in which reference numerals indicate specific elements.

It will be appreciated by those skilled in the art that the drawings and block diagrams shown herein depict conceptual representations and control flows for system components that comprise the present disclosure.

The high-level function of a typical HVAC controller is shown in FIG. 1. The traditional set-point control device 102 (e.g., such as a thermostat) provides a set-point for a particular variable (e.g. temperature) related to the building, or section of a building, 101. The set-point is passed to the output function 103, which accepts a variable and produces a control value (e.g. a logical on or off for control of a fan), which are fed back into the HVAC controller. The controller responds according to the control values to bring the actual variable state in accordance with the desired set point.

Figure 2:
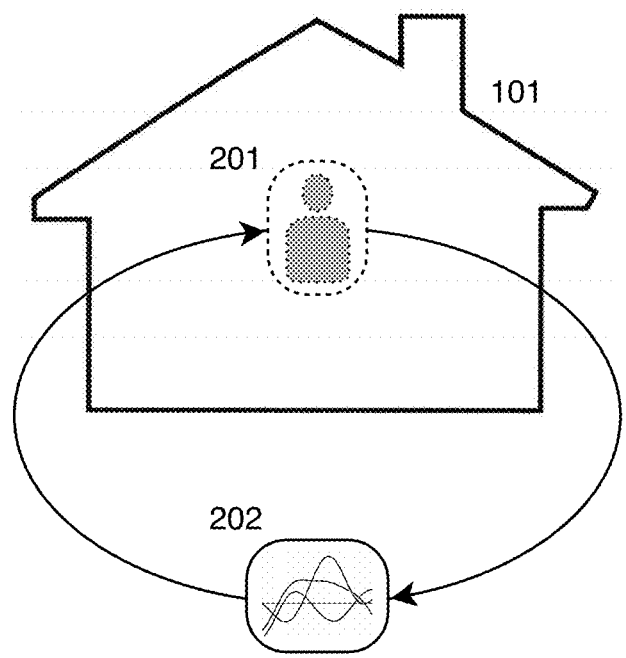
FIG. 2 illustrates how the concept of a meta-proxy of the present invention fits into the control loop embodied in FIG. 1.

FIG. 2 shows how the current embodiment replaces the traditional control device with a meta-proxy 201. The meta-proxy encapsulates the comfort preferences and comfort levels of all occupants in 101, thereby providing a more complete and accurate information set regarding the optimal variable settings with regard to occupant comfort. The output function 202 accepts as input a meta-proxy, rather than specific variable set-points as in a traditional system. The output function maps the meta-proxy to one or more controller values to be fed back into the HVAC controller.

Figure 3:
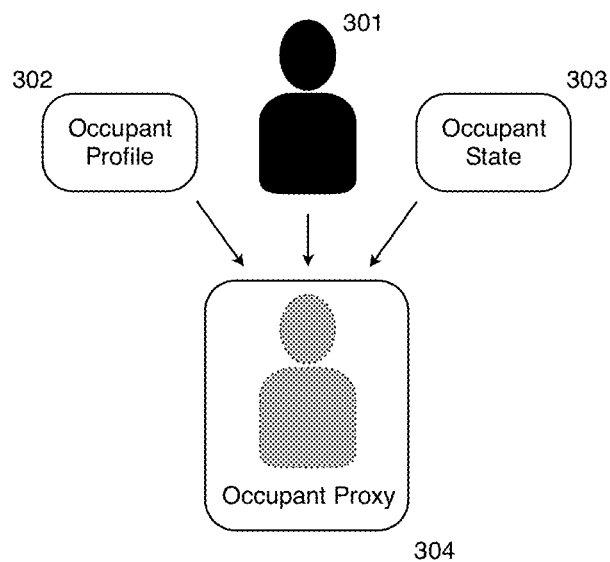
FIG. 3 illustrates how an occupant proxy of the present invention is formed from an occupant profile and current occupant state.

This occupant-driven approach to climate control relies in part on the creation of occupant proxies, shown in FIG. 3. Said figure shows the formation of occupant proxies 304 for each occupant 301 of the building or area to be controlled. The occupant profile 302 contains information specific to the occupant, such as body weight, gender, and/or age, among other elements. In one embodiment, this profile information is stored in an occupant database. The occupant state 303 contains potentially dynamic information about the current state of the occupant, such as information about current activity levels.

Additionally, in one embodiment, said state information may include active or passive occupant feedback on current comfort.

In one embodiment, this state information is gathered through a user interface through a mobile, wearable, handheld, and/or other electronic device and provided for use in formation of an occupant proxy 304. The creation of 304 involves aggregation of profile and state information relating to the comfort states of occupants into a suitable data structure.

The occupant user interface to an occupant proxy provides a user abstraction of one or more of variables such as metabolic rate, body weight, body mass-index, gender, age, occupancy, ethnicity, locality, clothing insulation value and so on.

The electronic device may comprise at least one sensor that measures occupant movement, motion, and/or other activity.

The sensor or sensors of the above mentioned electronic device, wherein the said movement, motion, and/or other activity is gathered, provide sensor data that may be used to calculate, for example, the metabolic rate, which can be further used in an occupant comfort measure.

Figure 4:
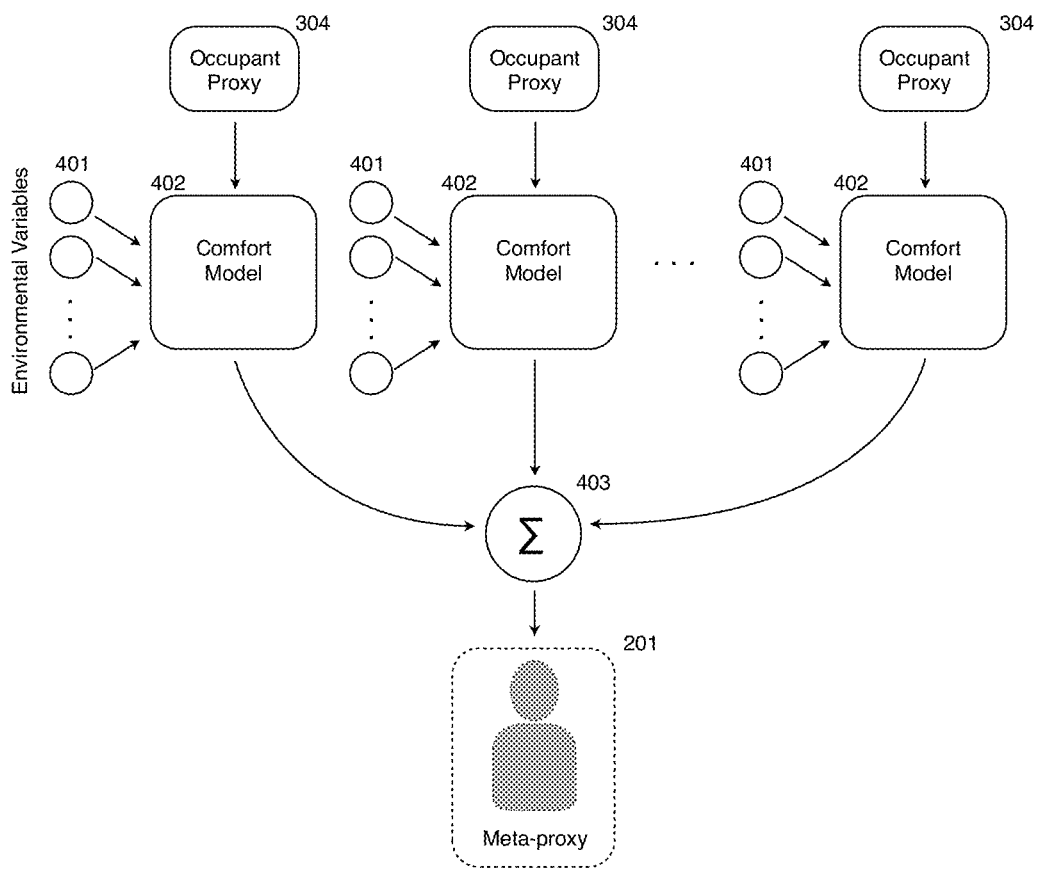
FIG. 4 illustrates how occupant proxies of the present disclosure are used as input to a comfort model along with environmental variables reflecting the current environmental state, and how the comfort model outputs are combined to form a meta-proxy.

Formation of a meta-proxy from occupant proxies is shown in FIG. 4. Each occupant proxy, one proxy for each occupant of 101, is provided to the human comfort model 402.

In addition to the occupant proxy, current environmental variables 401, comprising the environmental state, are provided to the comfort model 402.

In one embodiment, these environmental variables (e.g. ambient temperature, humidity) are provided by sensing devices as described above. The comfort model 402 accepts both the environmental state and occupant proxy 304 inputs and determines the comfort level of the occupant(s), where said model comprises a mathematical equation of human comfort which outputs the comfort state of the occupant(s).

The said mathematical equation comprises one or more of the variables like air temperature, radiant temperature, air velocity, humidity, metabolic rate, skin temperature, skin wetness, total evaporative heat loss from skin, skin surface area, sweat rate, body weight, body mass-index, gender, age, occupancy, ethnicity, locality, and/or clothing insulation value.

The mathematical equation of human comfort is a derivative of any of the following: Fanger Model, KSU Two-Node Model, Pierce Two-Node Model, Standard Effective Temperature Model, Adaptive Comfort Model, and/or any human comfort model described in the various non-patent literatures.

Occupant comfort mean function 403 aggregates the comfort states of all occupants, providing a method whereby each occupant proxy can vote in accordance with the respective occupant comfort levels and preferences. Function 403 produces the meta-proxy 201, which encapsulates information about the preferred conditions to maximize the number, percentage, and/or other measure of comfortable occupants.

Occupant comfort mean function 403, is attained by any of the following techniques like averaging methods, such as arithmetic mean, geometric mean, harmonic mean, tri-mean, median, mode, mid-range, quadratic mean (RMS), cubic mean, generalized mean, weighted mean; machine learning and statistical techniques, such as linear regression, logistic regression, polynomial regression, k-means clustering, k-nearest neighbors, decision trees, perceptron, multi-layer perceptron, kernel methods, support vector machines, ensemble methods, boosting, bagging, naïve Bayes, expectation maximization, Gaussian mixture models, Gaussian processes, principal component analysis, singular value decomposition, reinforcement learning, Voronoi decomposition; and social theory voting techniques and concepts, such as social welfare functions, social choice functions, single transferrable vote, Bucklin's rule, social decision schemes, collective utility functions, and/or Condorcet method and extensions such as Copeland's rule, maximin, Dodgson's rule, Young's rule, and/or ranked pairs.

The foregoing disclosure describes one possible embodiment of this invention, with no indication of preference to the particular embodiment. A skilled practitioner of the art will find alternative embodiments readily apparent from the previous drawings and discussion and will acknowledge that various modifications can be made without departure from the scope of the invention disclosed herein.

Accordingly, the reader will see that the model-based approach to environmental control of various embodiments disclosed herein can be used to effectively improve the current state of art by improving occupant comfort in buildings.

What is claimed is:

1. An environmental control system, comprising:
   a plurality of occupant proxies, one or more non-human asset proxies, a comfort model, a meta-proxy, and an output function, wherein:
      the comfort model comprises a mathematical equation of human comfort, the mathematical equation comprising or derived from predicted mean vote ("PMV") and predicted percentage of dissatisfied ("PPD");
      the plurality of occupant proxies each comprise a comfort state of an individual occupant;
      the one or more non-human asset proxies each comprise a comfort model for a non-human asset in or proximate to a building, the comfort model for the non-human asset comprising a mathematical equation of building asset comfort for the building, the mathematical equation of building asset comfort comprising one or more of an equipment environmental operation model, a metallic rust model, a building material moisture capacity model, a building material mold potential model, an animal comfort model, a plant health model, and a water freeze model;
      the comfort state comprises a function of the comfort model;
      the meta-proxy comprises a combined function of the plurality of occupant proxies and the one or more non-human asset proxies;
      the output function comprises a building system control path for the building as a function of the meta-proxy; and
      the output function receives the meta-proxy as an input and provides the building system control path as a path-based control output to control a building system for the building based on a combination of both the plurality of occupant proxies and the one or more non-human asset proxies.

2. The environmental control system of claim 1, wherein said comfort model comprises a mathematical equation of human comfort.

3. The environmental control system of claim 2, wherein said equation comprises one or more of the variables: air temperature, radiant temperature, air velocity, humidity, metabolic rate, skin temperature, skin wettedness, total evaporative heat loss from skin, skin surface area, sweat rate, body mass, skin mass, body mass-index, gender, age, occupancy, ethnicity, locality, and/or clothing insulation value.

4. The environmental control system of claim 2, wherein said equation is comprised or is a derivative of one or more of the following: Fanger Model, KSU Two-Node Model, ASHRAE 55, Pierce Two-Node Model, Standard Effective Temperature Model, Adaptive Comfort Model.

5. The environmental control system of claim 1, wherein said proxies comprise the comfort states of said occupants.

6. The environmental control system of claim 1, wherein said 7function may be comprised of, but not limited to, one or more of the following techniques: averaging methods, such as arithmetic mean, geometric mean, harmonic mean, trimean, median, mode, mid-range, quadratic mean (RMS), cubic mean, generalized mean, weighted mean; machine learning and statistical techniques, such as linear regression, logistic regression, polynomial regression, k-means clustering, k-nearest neighbors, decision trees, perceptron, multi-layer perceptron (neural network), kernel methods, support vector machines, ensemble methods, boosting, bagging, naïve Bayes, expectation maximization, Gaussian mixture models, Gaussian processes, principal component analysis, singular value decomposition, reinforcement learning, Voronoi decomposition; and social theory voting techniques and concepts, such as social welfare functions, social choice functions, single transferrable vote, Bucklin's rule, social decision schemes, collective utility functions, and Condorcet method and extensions such as Copeland's rule, maximin, Dodgson's rule, Young's rule, and ranked pairs.

7. The environmental control system of claim 1, wherein said output function may be comprised of, but not limited to, one or more system set-point adjustments, time series control paths, or predictive control paths.

8. The environmental control system of claim 1, wherein said output function may be comprised of, but not limited to, the control of air temperature, radiant temperature, humidity, air flow, lighting, and air flow noise.

9. An electronic device or network of electronic devices comprising:
   a motion sensor component;
   at least one memory; and
   one or more processors operatively coupled to the motion sensor component and one or more processors operatively coupled to the at least one memory, where the processors are configured to execute program code stored in the at least one memory to:
      receive motion measurements obtained with the motion sensor component;
      analyze the motion measurements to identify a degree of metabolic energy generated at least in part by the measured motion;
      compute a comfort of a mobile user via a human comfort model, the human comfort model comprising a mathematical equation of human comfort, the mathematical equation comprising or derived from predicted mean vote ("PMV") and predicted percentage of dissatisfied ("PPD");

compute, using an output function that receives a meta-proxy as an input, the meta-proxy comprising an occupant proxy for the mobile user based on the computed comfort and a non-human asset proxy for a non-human asset, a control offset between a combination of the comfort of the mobile user and a comfort for the non-human asset, and current environmental conditions, thus generating a control path as a path-based control output to control an environmental control system, the non-human asset proxy comprising a comfort model for a non-human asset in or proximate to a building, the comfort model for the non-human asset comprising a mathematical equation of building asset comfort, the mathematical equation of building asset comfort comprising one or more of an equipment environmental operation model, a metallic rust model, a building material moisture capacity model, a building material mold potential model, an animal comfort model, a plant health model, and a water freeze model; and transmit the control path to the environmental control system.

10. The electronic device of claim 9, wherein the motion sensor comprises a sensor or sensors that measure user movement, motion, heart rate, blood oxygen levels, accelerometers, gyroscopes, angular velocity, direction, GPS, and/or other activity sensors.

11. The electronic device of claim 9, wherein the electronic device is comprised of a mobile, wearable, handheld, and/or other person-attached electronic device.

12. The electronic device of claim 9 wherein the motion sensor is part of one or more devices, and some or all of the computation of claim 9 is performed on one or more external networked electronic devices.

13. The electronic device of claim 9 wherein the metabolic rate is computed periodically, and internally accumulated, such that the human comfort model comprises an internal heat capacity and a heat balance, the internal heat capacity and the heat balance representing a temporal comfort state of the occupant.

14. A system for a user interface representation of human comfort preferences in a human comfort model proxy driven environmental control system, the system comprising:

a computing device with a display;

an application interface;

objects in a graphical user interface, of the type in which representations of objects stored in a memory are displayed to a user on the display, wherein the objects comprise abstractions of comfort model parameters representing one or more human factors in the human comfort model proxy and one or more non-human factors in a non-human asset proxy for a non-human asset in or proximate to a building associated with the environmental control system; and whereby:

the comfort model parameters, in conjunction with environmental parameters, are used to calculate the human comfort model proxy, the human comfort model proxy comprising a mathematical equation of human comfort, the mathematical equation comprising or derived from predicted mean vote ("PMV") and predicted percentage of dissatisfied ("PPD"); and the human comfort model proxy and the non-human asset proxy are used as input into an output function to compute a control path as a path-based control output of the output function to control the environmental control system, the non-human asset proxy comprising a comfort model for the non-human asset in or proximate to the building, the comfort model for the non-human asset comprising a mathematical equation of building asset comfort, the mathematical equation of building asset comfort comprising one or more of an equipment environmental operation model, a metallic rust model, a building material moisture capacity model, a building material mold potential model, an animal comfort model, a plant health model, and a water freeze model.

15. The system of claim 14, wherein the abstractions of comfort model parameters comprise an abstraction of one or more of, but not limited to, metabolic rate, body mass, body mass-index, gender, age, occupancy, ethnicity, locality, and/or clothing insulation value.

16. The system of claim 15, wherein the user interface comprises a comfort input control for an occupant.

17. The system of claim 16, wherein the objects comprise an abstraction of, at least in part, a clothing insulation parameter of the comfort model parameters.

18. The system of claim 16, wherein the objects in the graphical user interface comprise an abstraction of a human comfort range, that computes an acceptable range within a standardized comfort scale that is computed by the human comfort model proxy.

19. The system of claim 16, wherein the abstractions of comfort model parameters comprise user inputs in a priori stored profile of the occupant.

* * * * *